Feb. 20, 1940.　　　M. KESSLER　　　2,191,320
HYDRAULIC CLUTCH AND BRAKE MECHANISM
Filed May 10, 1937　　　3 Sheets-Sheet 1

MARTIN KESSLER
INVENTOR

BY Gustav A. Wolff
ATTORNEY

MARTIN KESSLER
INVENTOR

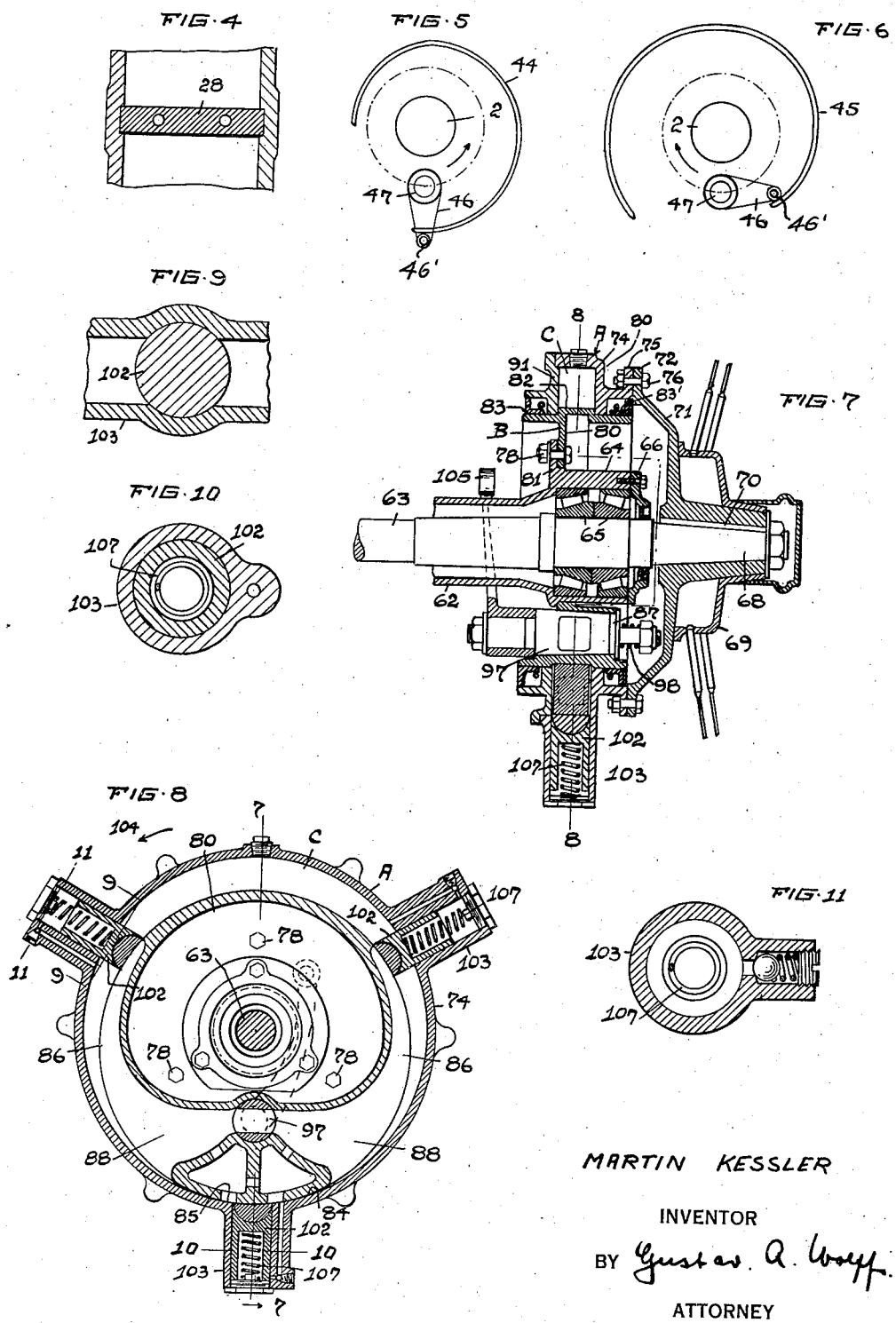

Patented Feb. 20, 1940

2,191,320

UNITED STATES PATENT OFFICE 2,191,320

HYDRAULIC CLUTCH AND BRAKE MECHANISM

Martin Kessler, Cleveland, Ohio

Application May 10, 1937, Serial No. 141,658

20 Claims. (Cl. 192—12)

This application which is a continuation in part of my pending application Ser. 710,671, filed Jan. 7, 1935, relates to improvements in hydraulic clutch and brake mechanism adapted to be used for power presses, wire draw benches and other power driven machines embodying continuously driven flywheels and coupling means for transmitting energy from the flywheel at irregular intervals to the driven parts of these machines. The invention has for its general object the provision of hydraulic clutch and brake mechanism having a clutch member and a brake member, each of which members circulates fluid in an endless, valved passage arranged in the respective member and generates clutching and/or braking power by controlling the flow of fluid in the respective passage.

Another object of the invention is the provision of hydraulic clutch and brake mechanism with a central valve member secured to the driven shaft of a power driven machine, and a piston supporting member secured to the continuously rotating flywheel of said machine, the piston supporting member being intersleeved with the valved member for forming an endless passage including the valved portion of the valved member.

A further object of the invention is the provision of a hydraulic clutch and brake mechanism for power driven machines embodying a clutch member and a brake member, each of the two members embodying inner and outer members intersleeved with each other for forming endless passages circulating fluid in their respective channels and being arranged side by side with their inner members secured to the driven shaft of the machine and their outer members secured to the flywheel of the machine and to a stationary part thereof respectively, so as to effect coupling action between the driven shaft and the flywheel and braking action on said shaft, when the flow of a fluid in the endless channels of the clutch and/or the brake is retarded or stopped by operation of the valves controlling the respective channels.

Still another object of the invention is the provision of hydraulic clutch and brake mechanism of the type referred to above, wherein the outer members of the clutch and brake yieldingly support shiftable piston members co-operating with spring-pressed plunger-like means in said outer members for counteracting centrifugal forces on said pistons, when said outer members rotate at high velocities and for shock-absorbing action of said pistons, when the flow of liquid in the endless passages of said clutch and brake is instantaneously stopped by too sudden closing of the respective valves.

With these and incidental objects in view, the invention consists in certain novel features of construction and combination of parts, the essential elements of which are set forth in the appended claims; and a preferred form of embodiment of the invention is hereinafter shown with reference to the drawings accompanying and forming part of this specification.

In the drawings:

Fig. 4 is a cross sectional view through one of the pistons of the clutch member, the section being taken on line 4—4 of Fig. 2;

Fig. 5 is a diagrammatical view of the cam mechanism actuating the valve arrangement of the clutch and brake mechanism for operating the clutch member, the view being taken on line 5—5 of Fig. 1;

Fig. 6 is a diagrammatical view of the cam mechanism actuating the valve arrangement of the clutch and brake mechanism for operating the brake member, the view being taken on line 6—6 of Fig. 1;

Fig. 7 is a transversal sectional view through a somewhat modified fluid brake mechanism according to the invention applied to the wheel of a vehicle, the section being taken on line 7—7 of Fig. 8;

Fig. 8 is a longitudinal sectional view through the fluid brake shown in Fig. 7, the section being taken on line 8—8 of Fig. 7;

Fig. 9 is a fragmentary sectional view on line 9—9 of Fig. 8, showing the cross-section of one of the pistons and the grooves for guiding the piston in the outer rotary member of the fluid brake;

Fig. 10 is a sectional view on line 10—10 of Fig. 8; and

Fig. 11 is a section through a piston chamber of the fluid brake shown in Figs. 7 and 8 indicating the relief check valve which controls the relief passage for fluid which has seeped into the piston chamber, the section being taken on line 11—11 of Fig. 8.

Figure 1:
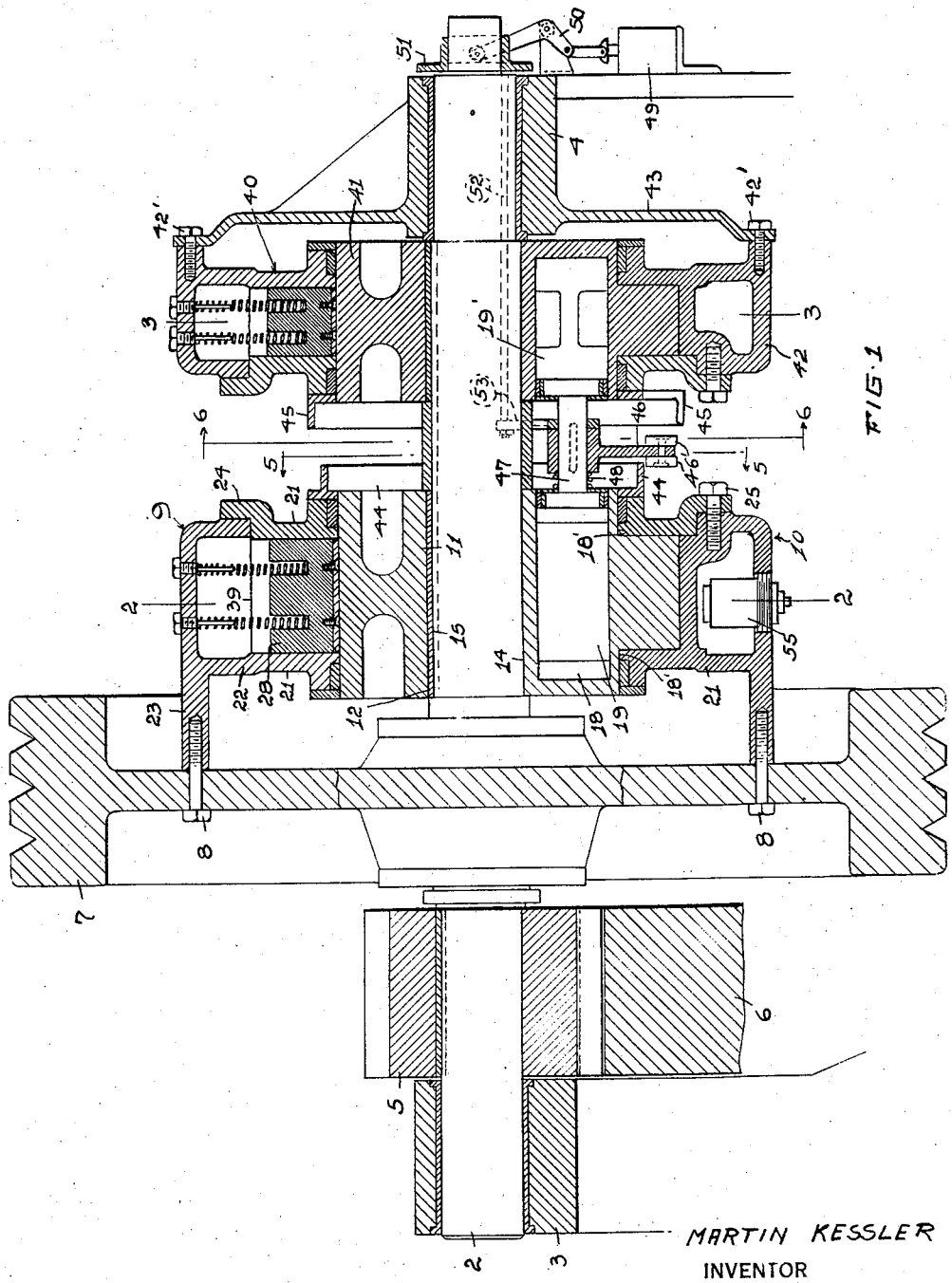
Fig. 1 is a transversal sectional view through a hydraulic clutch and brake mechanism according to the invention attached to and coupled with the flywheel and driven shaft of a power driven machine, such as a power press.
Figure 2:
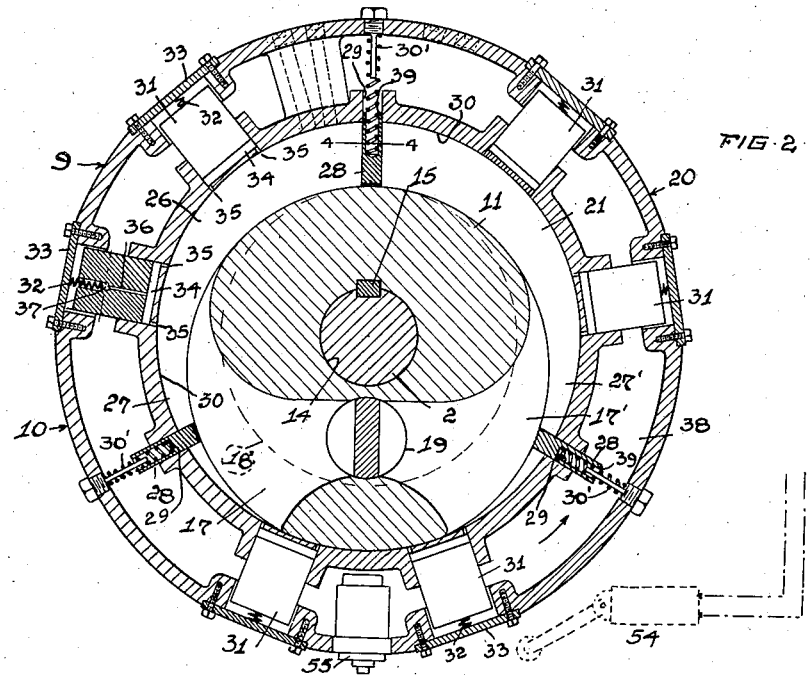
Fig. 2 is a transversal sectional view through the clutch member of the clutch and brake mechanism shown in Fig. 1, the section being taken on line 2—2 of Fig. 1.
Figure 3:
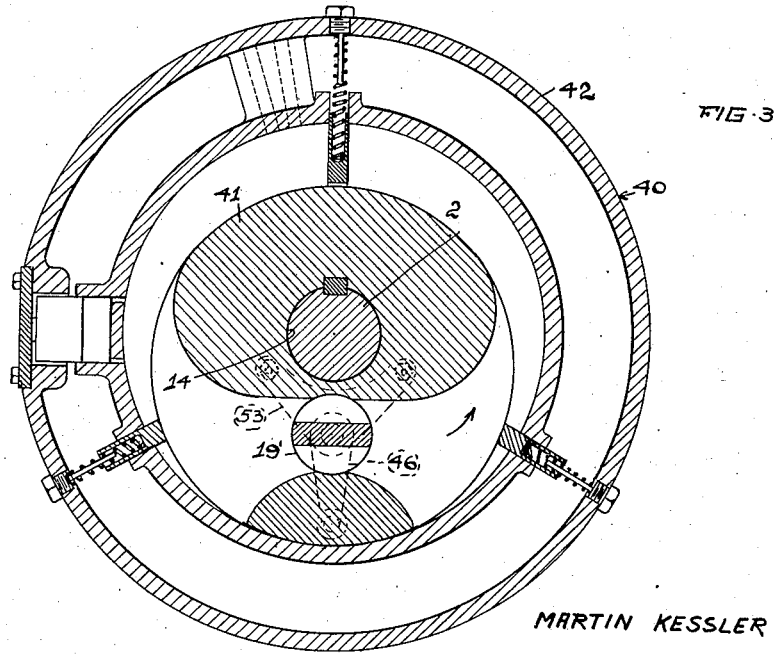
Fig. 3 is a transversal sectional view through the brake member of the clutch and brake mechanism shown in Fig. 1, the section being taken on line 3—3 of Fig. 1.

Referring now to Figs. 1 through 6 reference numeral 2 denotes a shaft supported in bearings 3 and 4, which shaft is coupled with the crank shaft of a power press, not shown, by means of gears 5 and 6 and has freely rotatably arranged thereon a flywheel 7 driven in any suitable manner. Flywheel 7 by means of cap screws 8 is secured to the rotary outer member 9 of a hydraulic clutch 10, the inner member 11 of which is keyed to the shaft 2 and consequently the flywheel transmits its rotary energy to the shaft 2, when the clutch 10 is actuated.

Inner member 11 of clutch 10, which member rotatably supports outer member 9, consists of a substantially cylindrically shaped body 12 with an eccentric keyed bore 14 to permit of the body 12 being eccentrically sleeved upon shaft 2 and secured to said shaft by means of a key 15. The body 12 furthermore is provided at its opposite sides with circular shoulders 18' arranged concentrically with respect to bore 14, which shoulders guide the outer member 9 and effect concentric rotation of said member around bore 14 and shaft 2. In addition, body 12 is provided with oppositely arranged channels 17, 17' respectively, separated by a valve chamber 18, which valve chamber has rotatably secured therein a valve 19 for restricting or fully closing communication between the opposed channels 17, 17'.

The thus formed inner member 11 rotatably supports the outer member 9 upon the circular shoulders 18', which member 9 consists of a substantially ring-shaped hollow body 20, having at opposite sides inwardly extending flanges 21, riding upon the shoulders 18' above referred to. Body 20 is made of a base portion 22, having laterally extending therefrom a circular flange 23 to facilitate attachment of said portion to the flywheel 7 by the cap screws 8, and a plate-like portion 24 secured to said base portion by cap screws 25, so as to permit of the body 20 being readily sleeved upon the shoulders 18' of the inner member 11.

The inner and outer members of the clutch being arranged eccentrically with respect to each other form a crescent-shaped chamber 26, the narrowed opposite ends 27, 27' of which are in communication with each other through channels 17, 17' and valve chamber 18, and this chamber is subdivided by spring-pressed abutment blades 28 slidably mounted in slots 29 in the inner wall 30 of outer member 9, which blades are yieldably forced into contact with the periphery of the body 12 of the inner member 11. Any liquid within chamber 26 will be carried around by blades 28 when the outer member 9 is rotated with respect to the inner member 11 and such rotation is controlled by the valve 19 in valve chamber 18, as all liquid must pass through this valve. Consequently, when the valve 19 is in a fully open position, then the liquid freely passes through the valve and then the outer member 12 can freely rotate, and when the valve is partly or fully closed, then the liquid is forced through said valve or prevented from passing therethrough, so that rotation of member 12 is retarded or entirely prevented, as the case may be.

As abutment blades 28 are yieldingly forced into contact with the periphery of the inner member 11 by means of light springs 30' centrifugal forces at higher speeds of the outer member tend to overcome the force of these springs, however, special means are provided to counteract any centrifugal forces on these abutment blades. Such means consist of a plurality of radially arranged, cylindrical plungers 31, slidably guided in the body 20 of the outer member 9 and forced inwardly by light springs 32, resting against said plungers and cover plates 33 of said outer member. These plungers fit snugly into cylinders 34 in the inner wall 30 of the member 9, which cylinders communicate with chamber 26 through narrow bores 35 and further embody central bores 36 having check valves 37 arranged therein. When member 9 is rotated at higher speeds then centrifugal forces on plungers 31 shift same outwardly, effect a compression of the liquid within the ring-shaped chamber 38 of the body 20, thereby press upon the exposed outer faces 39 of the abutment blades 29 and thus counteract centrifugal forces on said abutment blades. In addition, plungers 31 provide shock-absorbing means counteracting danger of breakage by too sudden closing of the controlling valve 18 and thereby insure smooth gripping action of the clutch.

In power driven machines it is necessary that operation of the machine is quickly stopped from further rotation as soon as the clutch is released. Such action is effected by a brake mechanism 40 of similar construction which is coupled with the clutch 10. This brake mechanism embodies inner and outer members 41, 42 respectively, similar in construction but narrower in width than the inner and outer members 9 and 11 of the clutch, therefore detailed description of members 41, 42 is deemed to be superfluous. However, member 42 is rigidly secured to the bearing 4 of shaft 2, cap screws 42' being used to attach member 42 to bracket-like extension means 43 on bearing 4.

Clutch 10 and brake mechanism 40 are adapted to cooperate. Thus, when the clutch is thrown in, then the brake is automatically released and vice versa. This co-operation of the two elements is effected by cams 44 and 45, cam 44 being secured to outer member 9 of clutch 10, and cam 45 being secured to brake member 42, which cams act upon the rollers 46' of a lever 46 slidably but non-rotatably secured to a shaft 47 coupled with the valve 19 for the clutch and the valve 19' for the brake, the valve being of course adjusted, so that valve 19 is fully closed when valve 19' is opened and vice versa. A shifting of the lever 46 on the shaft 47 is effected by a spring 48 and a solenoid 49, which latter, when energized, effects shifting of said lever into engagement with the cam 44 and therewith throwing in of the clutch by means of a bell crank 50, a collar 51 on shaft 2, and two symmetrically arranged push rods 52 secured to collar 51 and having their ends connected by a coupling plate 53, and which, when de-energized, permits of the lever 46 being shifted into engagement with the cam 45 by means of the spring 48.

An overload safety switch 54 actuated upon by a pressure responsive device 55 in the chamber 30 of the clutch 10 effects automatic stopping of the power driven machine in case of excessive loads and thus prevents breakage of the clutch and brake mechanism.

In operation the described clutch and brake mechanism is actuated by energizing solenoid 49, which then effects shifting of lever 46 on shaft 47 against the yielding force of spring 48 toward cam 44. Then the cam 44 causes lever 46 to be moved in such a fashion that shaft 47 will be rotated, so that valve 19 will be closed and valve 19' will be opened. Closing of valve 19 effects coupling of the rotary outer member 9 of clutch 10 with the inner member 11 so that flywheel 7 is coupled with shaft 2, and opening of valve 19' effects release of the coupling between the members 41 and 42 of the brake mechanism 40 and therewith releases the braking action of said mechanism. The valves 19 and 19' remain in their closed and opened positions until the solenoid 49 is deenergized and the yielding force of spring 48 shifts lever 46 on shaft 47 toward cam 45. This cam, being secured to brake member 42, is stationary, and effects shifting of lever 46, which lever rotates with the inner member 41, so that shaft 47 will be axially rotated in a direction effecting opening of valve 19 and closing of valve 19'. Such actuation of the valves effects release of the coupling of the members 9 and 11 of the clutch and coupling of the members 41 and 42 of the brake mechanism, so that the clutch is released and the brake mechanism is energized.

In Figs. 7 to 11 I have illustrated a somewhat modified form of a fluid brake attached to the rear axle housing of an automobile, which housing supports an axle 63 in its cylindrically enlarged end portion 64 by means of anti-friction roller bearings 65. A perforated end plate 66 permits of the housing being filled with a lubricant. The outer end 68 of the axle 63, which end extends through the plate 66, is keyed to a wheel 69 by means of a key 70. This wheel is provided with a cup-shaped, flanged disk 71, the flange 72 of which seats a ring-shaped member 74 having substantially angular cross section and is integrally formed with an L-shaped flange 75 opposite the flange 72 of disk 71 for rigid connection therewith by means of bolts 76.

The member 74 forms the body of a member A, is rotatably engaged with a cylindrical member B, rigidly mounted on housing 62 by bolts 78, which bolts extend through perforations in an internal circumferential flange 80 on housing 62. Member B embodies a central, raised circular portion 82 of larger diameter than the adjoining outer circular portions 83, 83' of said member and is axially offset with respect to the axis of member A and the wheel so as to contact at 85 with the inner wall 84 of the ring-shaped member 74. Circular portion 82 of member B is partially grooved at opposite sides of its contact point 85 with the wall 84 to form substantially symmetrically arranged channels 86. These channels communicate by means of symmetrically arranged passages 88 with a valve chamber 87 in member B opposite the contact point 85, which chamber has rotatably mounted therein a valve cock 97.

The circular end portions 83, 83' of cylindrical member B extend at opposite sides through a member A, the wall 90 of which abuts the circular portion 82 of member B, so as to form therewith a circular channel or fluid passage C, the opposite wall of which is formed by a perforated ring-shaped and flanged cover plate 91. This cover plate is sleeved upon the circular end portion 83 of member B and abuts the opposite side of the circular portion 82.

The passage C, which, as previously described, communicates with valve chamber 87 through channels 86 and passages 88, is of orbital form and permits of a brake fluid, air, oil or water being freely circulated therein. The circulation of the fluid is controlled by the valve cock 97 of the valve chamber 87. This valve cock is rotatably mounted and held in proper working position by means of a compression spring 98.

The brake fluid is circulated in passage C by slidable spring pressed abutments or pistons 102, carried by symmetrically arranged bosses 103, integrally formed on the member 74.

When the member A is rotated in the direction of arrow 104 (see Fig. 7) and the cock 97 is held in its fully opened position by actuating operating lever 105, then the pistons 102 carry the brake fluid successively from one side of passage C through the valve chamber 87 to the other side and hence back to the first side of passage C and so forth. Such circulation of the brake fluid meets no resistance with a fully opened valve position and therefore the fluid circulates freely, however, when the lever 105 rotates the cock 97 to partly closed position, then the brake fluid must be forced through a small passage and meets substantial resistance when passing through the partly closed valve chamber 87. This resistance against the circulation of the fluid generates a counter or braking power, which tends to stop rotation of the piston carrying member 14 and the wheel connected therewith. The developed braking power depends entirely upon the size of the passage through the partly closed valve chamber 87 and becomes infinite when valve chamber 87 is fully closed. In the latter instance the rotary member A and the stationary member B are tightly coupled with each other, as the fluid body is forced against a solid wall and prevents rotation of the member A.

The pistons 102 when riding upon member B reciprocate in their cylinders. Each of these pistons, when the cock 97 is actuated and suddenly acts as a shock absorbing element, restricts the circulation of the fluid, in which case the piston counteracts the braking power and prevents breakage of parts, should the valve chamber 87 be closed too abruptly. This timely shock absorbing action of the piston members is possible on account of the grooves or channels 86, which channels permit of pressure being exerted upon the bottom face of the pistons for effecting yielding movement of the pistons against the tension of the springs 106.

Having thus described my invention, what I claim is:

1. In a hydraulic clutch and brake mechanism a rotary shaft, rotary driving means, a hydraulic clutch member adapted to couple said rotary driving means with said shaft, a hydraulic brake member adapted to brake said shaft when not coupled with said rotary driving means, and a single controlling means for said clutch member and said brake member, said clutch and brake members each embodying an inner member rigidly coupled with said rotary shaft, said clutch member embodying a rotary outer member rigidly coupled with said rotary driving means, and said brake member embodying a stationary outer member.

2. In a hydraulic clutch and brake mechanism a rotary shaft, two substantially circular members, secured in aligned and spaced relation to said shaft, each of said members embodying a cross passage and a valve controlling said passage, a ring-shaped member for each of said circular members eccentrically encircling same and forming an endless fluid channel including said passage and valve, piston-like abutment means shiftably mounted in each ring-shaped member for riding upon the periphery of the respective circular member, a single controlling means for simultaneously actuating the valves in said two circular members, and cam means for operating said controlling means.

3. In a hydraulic clutch and brake mechanism a rotary shaft, two substantially circular members secured in aligned and spaced relation to said shaft, each of said members embodying channel-like recesses in its periphery, a passage connecting said recesses, and a valve controlling said passage, a ring-shaped member for each of said circular members eccentrically encircling same and forming an endless fluid channel including said recesses, passage and valve, piston-like abutment means shiftably mounted in each ring-shaped member for riding upon the periphery of the respective circular member and bridging said recesses, a rotatable shaft between said two circular members coupled with the valves in said passages, lever means slidably and non-rotatably secured to said rotatable shaft, and cam means co-operating with said lever means in controlling said valves by rotating said rotatable shaft.

4. In a hydraulic clutch and brake mechanism a rotary shaft, an inner member secured to said shaft for rotation therewith, an outer member encircling said inner member and forming a crescent-shaped working chamber therewith, abutment means carried by one of said members and subdividing said chamber into compartments, a passage connecting said compartments, a valve in said passage, a second inner member secured to said shaft in spaced relation with respect to said first inner member, a stationary outer member encircling said second inner member and forming a second crescent-shaped working chamber therewith, abutment means carried by one of said stationary outer member and/or said second inner member for subdividing said second chamber into compartments, a passage connecting said last compartments, a valve controlling said last named passage, and controlling means for actuating both of said valves in timed relation with respect to each other.

5. A hydraulic clutch and brake mechanism for controlling the rotation of a shaft comprising a clutch member coupled with said shaft and a brake member co-operating with said clutch member and coupled with said shaft, said clutch and brake members each embodying inner members rigidly secured to said shaft in spaced relation with respect to each other, outer members encircling said inner members and forming crescent-shaped working chambers therewith, abutment means subdividing each of said working chambers into compartments, passage means in said inner members interconnecting the respective inner compartments, and valve means in said passage means, and means coupled with said valve means for controlling same in timed relation with respect to each other.

6. A hydraulic clutch and brake mechanism as described in claim 5, embodying means for rigidly mounting the outer member of said brake member.

7. A hydraulic clutch and brake mechanism comprising a hydraulic clutch, a hydraulic brake, a rotary shaft supporting said clutch and brake and actuated thereby, and means for engaging and disengaging in sequence said clutch and brake with said shaft, said hydraulic brake embodying a circular inner member, a larger outer member sleeved upon said inner member in axially offset relation with respect thereto, so as to contact at one side therewith and to form a crescent-shaped working chamber between said two members, said two members being rotatable with respect to each other, a valve chamber in said inner member, oppositely arranged channel-like recesses in the periphery of said inner member in open communication with said valve chamber to form a substantially circuitous passage between said two members, valve means in said valve chamber, and yieldingly shiftable means carried by said outer member and extending into said working chamber for yielding contact with the periphery of said inner member, said shiftable means being adapted to circulate a fluid in said passage to and through said valve chamber, and absorb shock-like braking action by too sudden operation of said valve when said members rotate with respect to each other.

8. A hydraulic clutch and brake mechanism comprising a hydraulic clutch, a hydraulic brake, a rotary shaft supporting said clutch and brake and actuated thereby, and means for engaging and disengaging in sequence said clutch and brake with said shaft, said hydraulic brake embodying a circular inner member having symmetrically arranged channel-like recesses in its periphery, a valve chamber between and connecting said recesses, a valve in said valve chamber, an outer member encircling said inner member and forming an endless fluid channel therewith, said members being rotatable with respect to each other and said valve controlling the circulation of fluid in said channel, and means radially shiftably arranged within said outer member and extending into said endless channel and riding upon the periphery of said inner member for subdividing the said endless channel and causing circulation of the fluid therein.

9. A hydraulic clutch and brake mechanism as described in claim 8, having shiftable means within said outer member of said brake consisting of spring-pressed hollow pistons dimensioned to closely fit the width of said chamber, so as to subdivide said chamber and bridge the channel-like recesses in the periphery of said inner member when riding on said periphery, and effect a shock absorbing action during abrupt closing of said valve.

10. A hydraulic clutch and brake mechanism comprising a hydraulic clutch, a hydraulic brake, a rotary shaft supporting said clutch and brake and actuated thereby, and means for engaging and disengaging in sequence said clutch and brake with said shaft, said hydraulic brake comprising an inner member of substantially cylindrical form, a rotatable valve mounted in said inner member, parallel to the axis thereof, channel-like recesses of substantial length in the periphery of said inner member at opposite sides of said valve and in communication therewith, an outer member sleeved upon said inner member in axially offset relation thereto for forming an endless passage including said recesses and controlled by said valve, and yielding means shiftably mounted in said outer member for riding upon said inner member and bridging the recesses therein, said yielding means circulating the fluid in said passage without interfering with the valve in said inner member.

11. A hydraulic clutch and brake mechanism comprising a hydraulic clutch, a hydraulic brake, and a rotary shaft supporting said clutch and brake and actuated thereby, and means for engaging and disengaging in sequence said clutch and brake with said shaft, said hydraulic brake comprising a circular inner member, substantially oppositely arranged channel-like recesses of substantial length in a portion of the periphery of said chamber, a valve chamber in said member having inlet and outlet passages communicating with said channels, a valve in said valve chamber, and an outer member encircling said inner member in axially offset relation with respect thereto, said inner and outer members being rotatable with respect to each other and forming a circular fluid passage including said valve chamber and valve, and shiftable means carried by said outer member and adapted to ride upon the periphery of said inner member and bridge said channel-like recesses to effect circulation of fluid in said circular passage when said inner and outer members rotate with respect to each other.

12. A hydraulic clutch and brake mechanism comprising a hydraulic clutch; a hydraulic brake; said clutch and brake each embodying a substantially circular inner member having oppositely arranged passages communicating with a valve chamber with a valve in said chamber, an outer member eccentrically encircling said inner member for forming an endless fluid channel including said passages and valve chamber, and yielding means shiftably mounted in said outer member and riding upon the periphery of the inner member; and means rigidly connecting the inner members of said clutch and brake with each other in a manner that their valves are axially aligned.

13. A hydraulic clutch and brake mechanism as described in claim 12, wherein means are provided for jointly actuating the aligned valves of said clutch and said brake.

14. A hydraulic clutch and brake mechanism comprising a hydraulic clutch, a hydraulic brake, a rotary shaft supporting said clutch and brake and actuated thereby, and means for engaging and disengaging in sequence said clutch and brake with said shaft, said hydraulic clutch embodying a valved inner member, and an outer member, said members forming an endless valve-controlled fluid passage, piston-like abutment means shiftably mounted in said outer member riding upon the periphery of said inner member for circulating fluid in said endless passage, and means in said outer member counteracting centrifugal forces on said abutment means during rotation of said outer member.

15. A hydraulic clutch and brake mechanism comprising a hydraulic clutch, a hydraulic brake, a rotary shaft supporting said clutch and brake and actuated thereby, and means for engaging and disengaging in sequence said clutch and brake with said shaft, said hydraulic clutch embodying a substantially circular inner member, a valved passage in said member and a valve controlling said passage, an outer member eccentrically encircling said inner member for forming an endless fluid channel including said valved passage and controlled by said valve, piston-like abutment means shiftably mounted in said outer member for riding upon the periphery of said inner member, and means counteracting centrifugal forces on said abutment means during rotation of said outer member.

16. A clutch and brake mechanism as described in claim 15, wherein said outer member of said clutch embodies a ring-shaped chamber filled with liquid, wherein said abutment means extend into said ring-shaped chamber, and wherein said counteracting means embody piston means shiftably extended into said ring-shaped chamber and dimensioned to effect increase of the pressure of the liquid in said chamber proportionate to the centrifugal force acting on said abutment means.

17. A hydraulic clutch and brake mechanism as described in claim 14, wherein said outer member of said clutch is chambered and filled with liquid, wherein said abutment means slidably extend into the liquid filled chamber of said outer member, and wherein said counteracting means embody members slidably extended into said liquid filled chamber of said outer member for increasing the pressure of liquid in said chamber substantially proportionate to the centrifugal force acting on said abutment means.

18. A hydraulic clutch and brake mechanism as described in claim 14, wherein said outer member of said clutch is chambered and filled with liquid, wherein said abutment means slidably extend into the liquid filled chamber of said outer member, and wherein said counteracting means embody members slidably guided in recessed bosses in the liquid filled chamber of said outer member, which bosses communicate with the endless fluid passage of said hydraulic member for effecting coupling with shock absorbing action between said outer and inner members.

19. A hydraulic clutch and brake mechanism as described in claim 14, wherein said outer member of said clutch is chambered and filled with liquid, wherein said abutment means slidably extend into the liquid filled chamber of said outer member, wherein said counteracting means embody members slidably guided in recessed bosses in the liquid filled chamber, which bosses communicate with the endless fluid passage of said hydraulic member for effecting coupling with shock absorbing action between said outer and inner members, and wherein pressure actuated control means are provided in said liquid chamber to control the power for driving said outer member of said hydraulic member.

20. In a hydraulic clutch and brake mechanism a hydraulic clutch, a hydraulic brake, a rotary shaft supporting said clutch and brake and actuated thereby, and means for engaging and disengaging in sequence said clutch and brake with said shaft, said hydraulic clutch embodying a substantially circular inner member, a valved passage in said member and a valve controlling said passage, an outer member eccentrically encircling said inner member for forming an endless fluid channel including said valved passage and controlled by said valve, piston-like abutment means shiftably mounted in said outer member for riding upon the periphery of said inner member, and means counteracting centrifugal forces on said abutment means during rotation of said outer member.

MARTIN KESSLER.